US006965237B2

(12) United States Patent
Kuo et al.

(10) Patent No.: US 6,965,237 B2
(45) Date of Patent: Nov. 15, 2005

(54) DEVICE FOR SCANNING OR DETECTING ELECTROMAGNETIC WAVES

(76) Inventors: Shu Shoung Kuo, P.O.Box 10-69, Chong Ho, Taipei (TW) 235; Shu Ling Kuo, P.O.Box 10-69, Chong Ho, Taipei (TW) 235

(*) Notice: Subject to any disclaimer, the term of this patent is extended or adjusted under 35 U.S.C. 154(b) by 455 days.

(21) Appl. No.: 10/261,306

(22) Filed: Sep. 27, 2002

(65) Prior Publication Data

US 2004/0061501 A1  Apr. 1, 2004

(51) Int. Cl.[7] ............................................... G01V 3/08
(52) U.S. Cl. .................. 324/332; 315/291; 315/209 R; 315/107; 324/633; 324/95; 324/73.1
(58) Field of Search ........................ 343/703; 324/332, 324/95, 149, 633, 73.1; 250/591, 252.1, 580, 250/341; 340/600, 552; 315/291, 107, 209 R

(56) References Cited

U.S. PATENT DOCUMENTS

| 6,232,881 B1 * | 5/2001 | Suda ........................... 340/600 |
| 6,254,513 B1 * | 7/2001 | Takenaka et al. .............. 482/3 |
| 6,516,209 B2 * | 2/2003 | Cheng et al. ................ 600/323 |
| 6,614,054 B1 * | 9/2003 | Ahn ............................ 257/72 |

* cited by examiner

*Primary Examiner*—Don Wong
*Assistant Examiner*—Chuc Tran
(74) *Attorney, Agent, or Firm*—Troxell Law Office, PLLC

(57) ABSTRACT

A detecting device for detecting electromagnetic waves generated by electric facilities includes a support having a peripheral surface for attaching a number of wave detectors which detect the electromagnetic waves generated by the electric facilities. The support may include a housing having a chamber for receiving the electric facilities, or having a curved outer peripheral surface for supporting the wave detectors. The wave detectors each has a number of light devices for indicating the strength of the received electromagnetic waves.

4 Claims, 6 Drawing Sheets

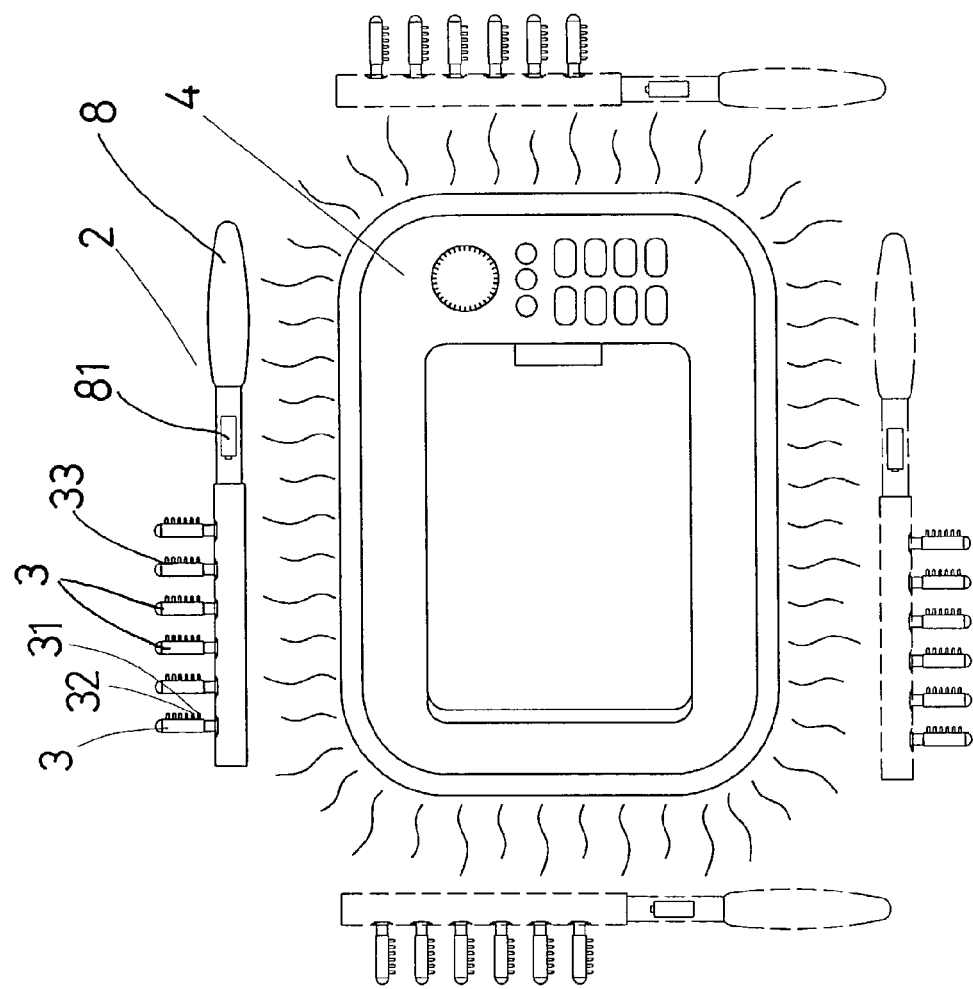

DEVICE FOR SCANNING OR DETECTING ELECTROMAGNETIC WAVES

BACKGROUND OF THE INVENTION

1. Field of the Invention

The present invention relates to a detecting device, and more particularly to a detecting device for scanning or detecting or observing the waves, such as the radio waves or electromagnetic waves.

2. Description of the Prior Art

Typically, electric facilities, such as the electromagnetic stoves, the portable phones or mobile phones may generate strong electromagnetic waves which have been found or tested to hurt people, particularly the brains of the users. At present, only complicated or huge detecting devices may be used for detecting the electromagnetic waves.

However, the public or the people may not afford to obtain or to have, or even to carry the complicated or huge detecting devices to detect or to observe or to scan the electromagnetic waves. Particularly, while purchasing the electric facilities, the users may not carry the typical complicated or huge detecting devices with them, and thus may not know or detect the electromagnetic waves that may be generated by the electric facilities.

The present invention has arisen to mitigate and/or obviate the afore-described disadvantages of the conventional detecting devices.

SUMMARY OF THE INVENTION

The primary objective of the present invention is to provide a detecting device for easily scanning or detecting or observing the waves, such as the radio waves or the electromagnetic waves generated by the electric facilities.

The other objective of the present invention is to provide a detecting device for being easily carried by the users to easily and quickly detect or observe the radio or electromagnetic waves generated by the electric facilities.

The further objective of the present invention is to provide a detecting device for detecting the strengths of the electromagnetic waves emitted from various directions.

In accordance with one aspect of the invention, there is provided a detecting device for detecting electromagnetic waves generated by electric facilities, the detecting device comprising a support including a peripheral surface, and a number of wave detectors attached onto the peripheral surface of the support to detect the electromagnetic waves generated by the electric facilities. The support and the wave detectors of the detecting device include a small structure or volume that may be easily carried by the users, and may thus be easily used to detect the electromagnetic waves that may be generated by the electric facilities.

The support includes a housing having a chamber formed therein for receiving the electric facilities that generate the electromagnetic waves to be detected and observed by the users.

The housing may include a curved outer peripheral surface having the wave detectors disposed thereon.

The wave detectors may be disposed radially relative to the housing for indicating the strength of the electromagnetic waves.

The wave detectors each includes a plurality of light devices attached thereon, and may be energized to indicate the receiving of the electromagnetic waves.

The wave detectors each includes a longitudinal structure having the light devices disposed longitudinally along the longitudinal wave detectors, for indicating the strength of the electromagnetic waves.

Further objectives and advantages of the present invention will become apparent from a careful reading of a detailed description provided hereinbelow, with appropriate reference to accompanying drawings.

BRIEF DESCRIPTION OF THE DRAWINGS

FIG. 6 is a plan schematic view illustrating the operation of the detecting device as shown in FIG. 5.

DETAILED DESCRIPTION OF THE PREFERRED EMBODIMENT

Figure 1:
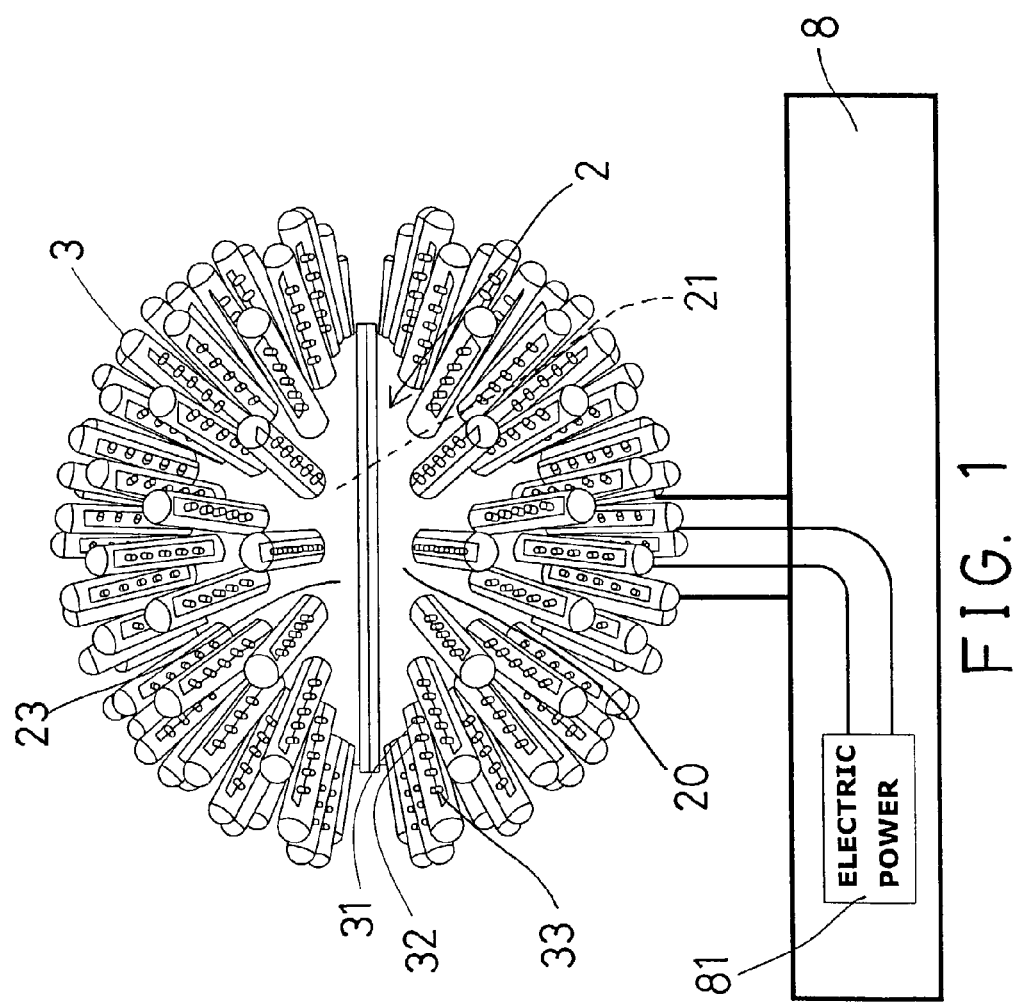
FIG. 1 is a plan schematic view of a detecting device in accordance with the present invention.
Figure 2:
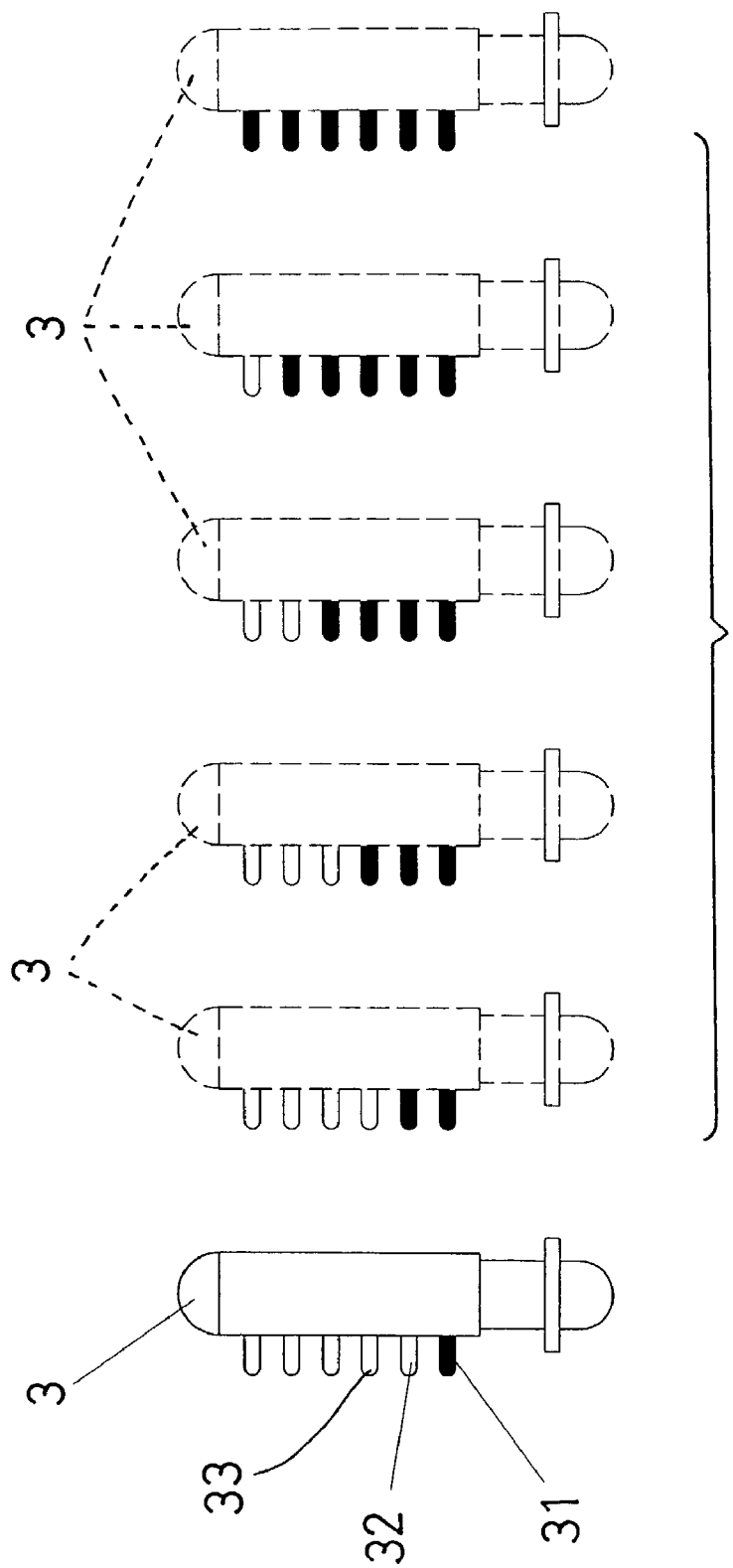
FIG. 2 is a plan schematic view illustrating a number of wave detectors of the detecting device.
Figure 3:
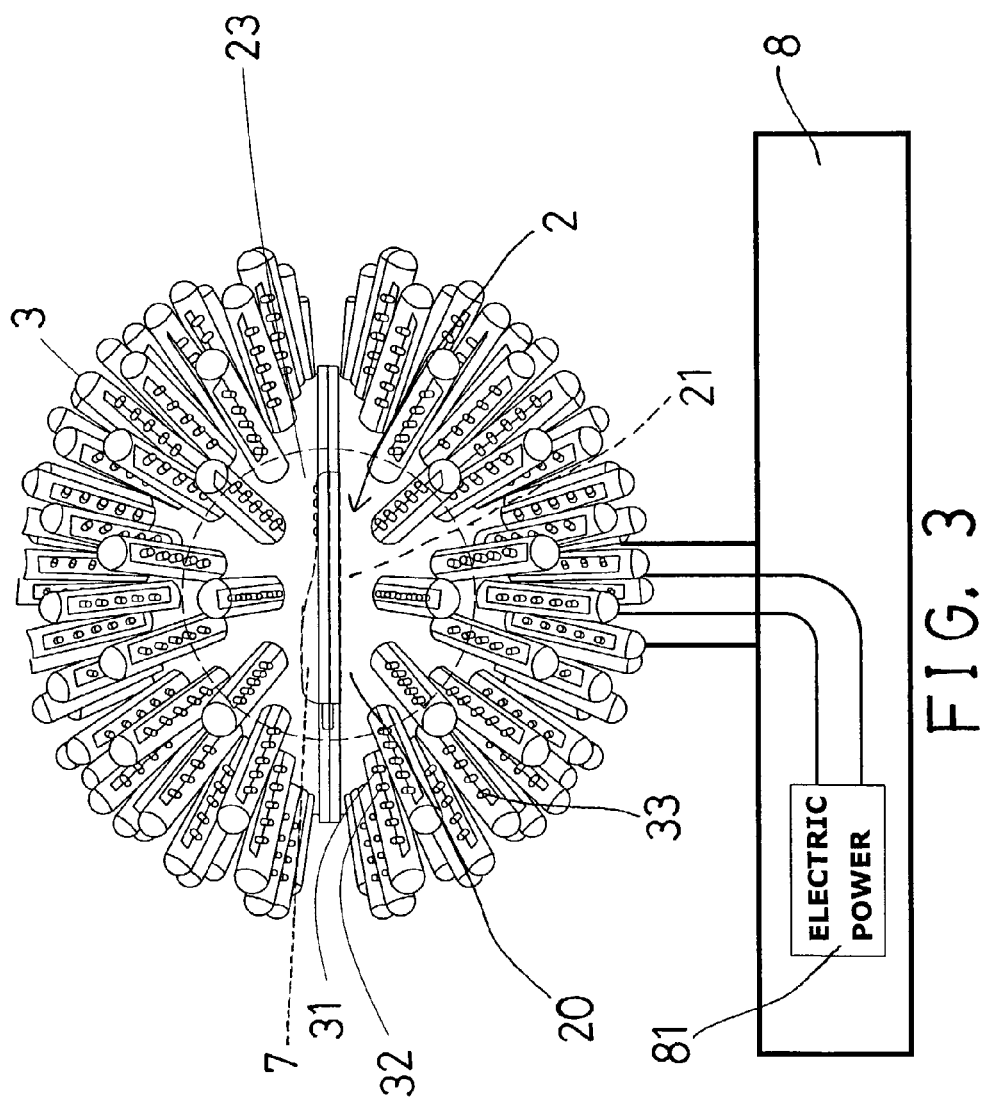
FIGS. 3 and 4 are plan schematic views similar to FIG. 1, illustrating the operation of the detecting device.

Referring to the drawings, and initially to FIGS. 1–3, a detecting device in accordance with the present invention comprises a support 2, such as a spatial housing 20 having a hollow chamber 21 formed or provided therein for receiving the electric facilities 7 (FIGS. 3, 4), such as the portable phones or mobile phones 7, to be detected therein.

The support 2 includes a number of wave detectors 3 disposed on the outer peripheral surface 23 thereof, or of the housing 20, for receiving or detecting or scanning the electromagnetic waves that may be generated by the electric facilities.

As best shown in FIG. 2, the wave detectors 3 each includes one or more light emitting diodes or light devices 31, 32, 33 provided or attached thereon. It is preferable that the wave detectors 3 each includes a longitudinal structure having the light devices 31–33 arranged along the longitudinal direction of the wave detectors 3.

Figure 4:
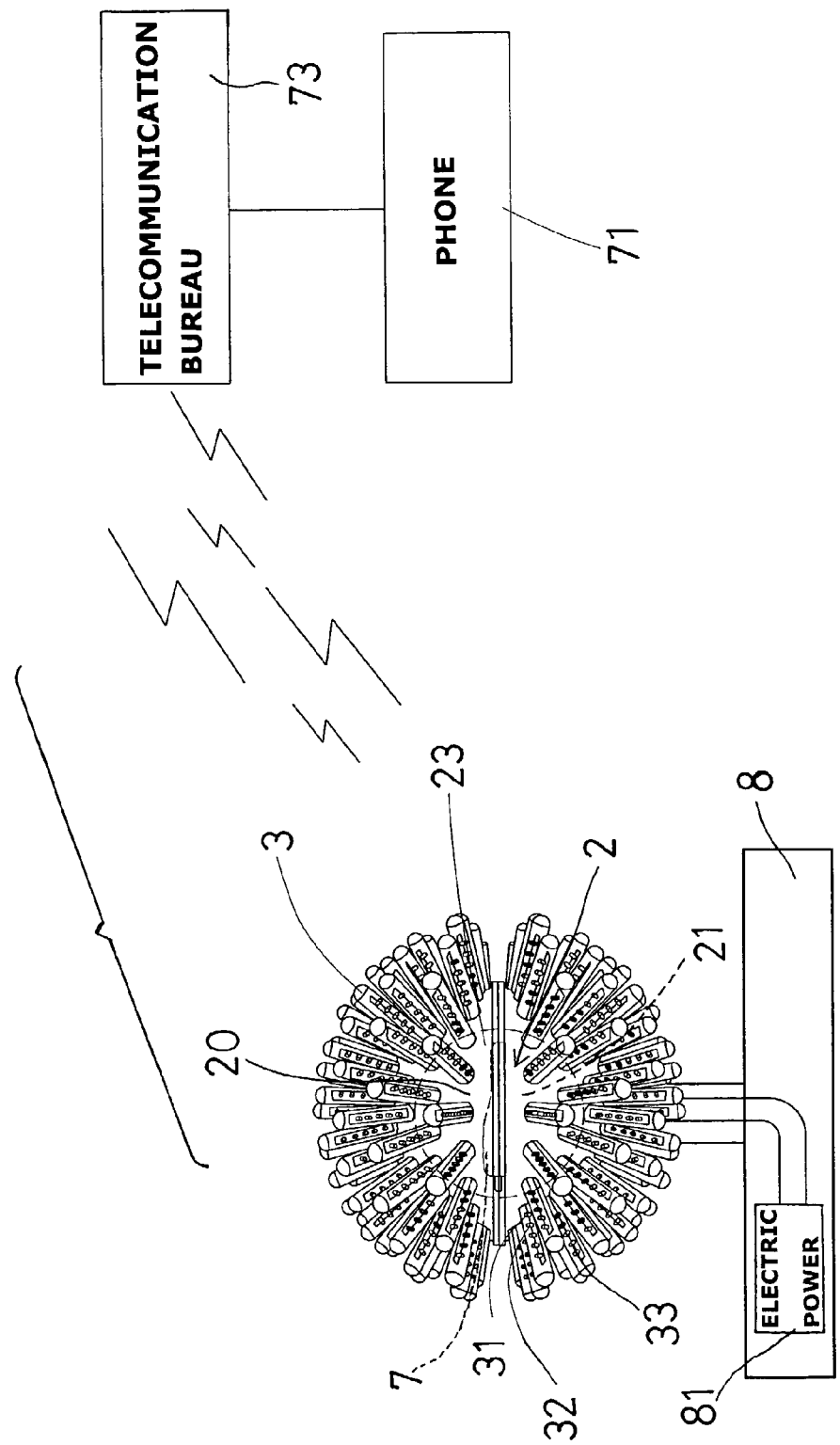

As shown in FIGS. 1, 3, 4, the wave detectors 3 are secured to the outer peripheral surface 23 of the housing 20 and are disposed or extended or arranged radially relative to the spherical housing 20, such that the light devices 31–33 of the wave detectors 3 may also be arranged radially relative to the spherical housing 20.

As shown in FIGS. 1, 3, 4, an electric power source or device 8 or the like may further be provided, and having an electric power supply or having one or more batteries 81 provided therein and coupled to the wave detectors 3 for energizing the wave detectors 3 to receive or detect or scan the electromagnetic waves that may be generated by the electric facilities As shown in FIG. 2, various numbers of the light devices 31–33 of the wave detectors 3 may be energized or actuated by the electromagnetic waves generated by the phone 7. For example, when the electromagnetic waves is weaker, none or one or few light devices 31–33 may be energized. On the contrary, when the electromagnetic waves is stronger, three or more light devices 31–33 may be energized.

In operation, as shown in FIG. 4, when the phone 7 receives a call from another phone 71 transmitted via the telecommunication bureau 73, for example, the phone 7 may generate the typical electromagnetic waves, and the wave detectors 3 may receive and detect and scan the electromagnetic waves generated by the phone 7.

The numbers of the light devices 31–33 of various or different wave detectors 3 that are energized or actuated by the electromagnetic waves may indicate the strength of the electromagnetic waves, and particularly may indicate which directions of the electromagnetic waves generated by the phone 7 are stronger or weaker.

Figure 5:
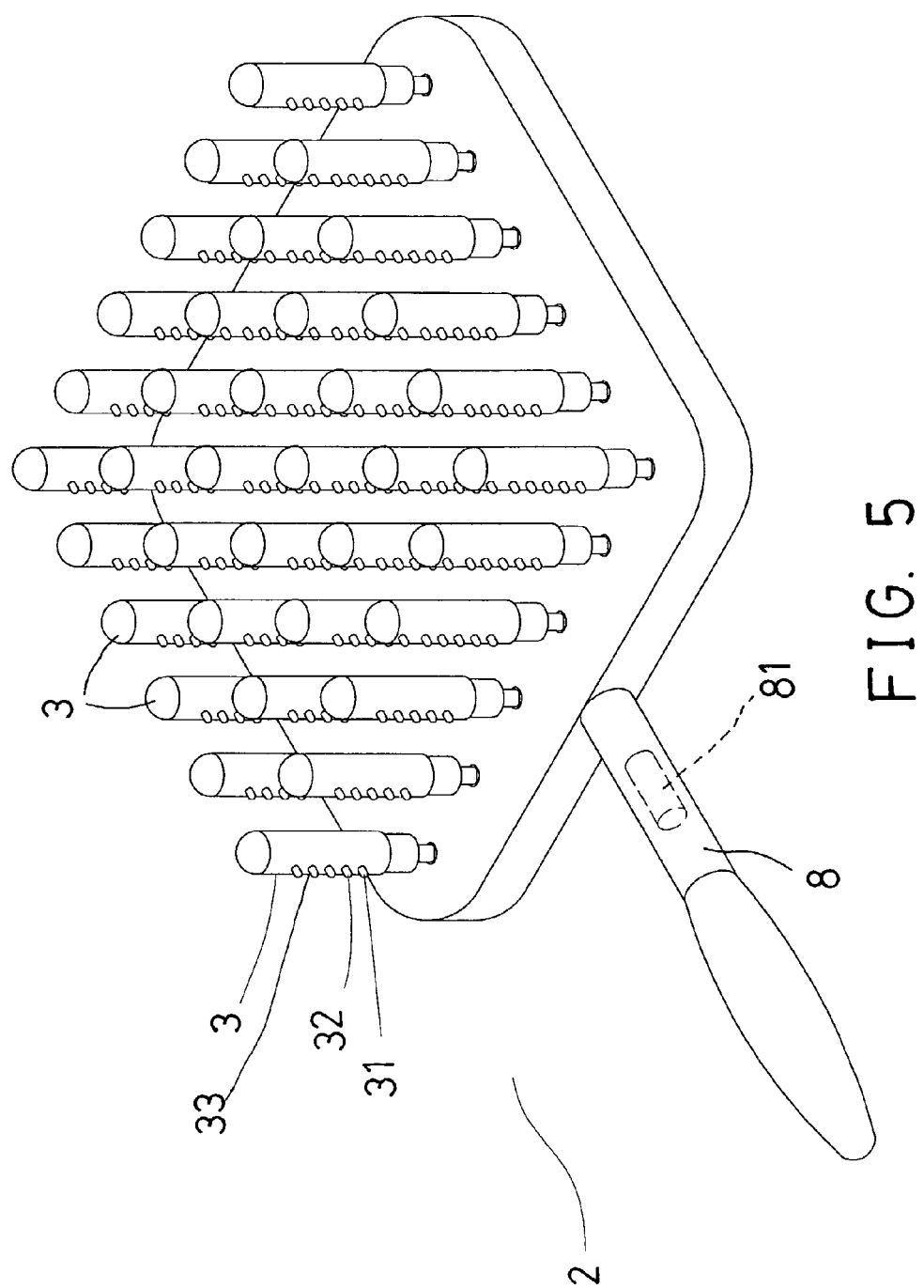
FIG. 5 is a perspective view illustrating the other arrangement of the detecting device.

Referring next to FIGS. 5 and 6, the support 2 may also include a planar structure for supporting the wave detectors 3 which may also be energized by the batteries 81 of the electric power source or device 8. The detecting device may also be moved around various kinds of electric facilities 4, to detect the electromagnetic waves that may be generated by the electric facilities 4.

It is to be noted that the support 2 and the wave detectors 3 of the detecting device include a small structure or volume that may be easily carried by the users, and may thus be easily used to detect the electromagnetic waves that may be generated by the electric facilities 4, 7. The wave detectors 3 may be attached onto the outer peripheral surface 23 of the support 2 that may have planar structure or spherical or curved structure.

Accordingly, the detecting device in accordance with the present invention includes a small structure that may be easily carried by the users to easily and quickly detect or observe the radio or electromagnetic waves generated by the electric facilities, and particularly to detect the strengths of the electromagnetic waves emitted from various directions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A detecting device for detecting electromagnetic waves generated by electric facilities, said detecting device comprising:

a support including a peripheral surface, and a plurality of wave detectors attached onto said peripheral surface of said support to detect the electromagnetic waves generated by the electric facilities, wherein said wave detectors each includes a plurality of light devices attached thereon, and wherein said wave detectors each includes a longitudinal structure having said light devices disposed longitudinally along said longitudinal wave detectors.

2. The detecting device according to claim 1, wherein said support includes a housing having a chamber formed therein for receiving the electric facilities.

3. The detecting device according to claim 2, wherein said housing includes a curved outer peripheral surface having said wave detectors disposed thereon.

4. The detecting device according to claim 3, wherein said wave detectors are disposed radially relative to said housing.

\* \* \* \* \*